(12) United States Patent
Xiang et al.

(10) Patent No.: US 12,360,599 B2
(45) Date of Patent: Jul. 15, 2025

(54) METHOD AND SYSTEM FOR GENERATING HAPTIC FEEDBACK EFFECT, AND RELATED DEVICE

(71) Applicant: AAC Acoustic Technologies (Shanghai)Co., Ltd., Shanghai (CN)

(72) Inventors: Zheng Xiang, Shenzhen (CN); Liang Jiang, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 321 days.

(21) Appl. No.: 18/091,335

(22) Filed: Dec. 29, 2022

(65) Prior Publication Data

US 2024/0061506 A1 Feb. 22, 2024

Related U.S. Application Data

(63) Continuation of application No. PCT/CN2022/121723, filed on Sep. 27, 2022.

(30) Foreign Application Priority Data

Aug. 19, 2022 (CN) .......................... 202210999900.6

(51) Int. Cl.
  *G06F 3/01* (2006.01)
  *G08B 6/00* (2006.01)
(52) U.S. Cl.
  CPC ............... *G06F 3/016* (2013.01); *G08B 6/00* (2013.01)
(58) Field of Classification Search
  CPC .. G06F 3/016; G06F 3/01; G08B 6/00; G06N 3/08
  See application file for complete search history.

(56) References Cited

U.S. PATENT DOCUMENTS

| 11,355,097 B2* | 6/2022 | Chen ...................... G06N 3/045 |
| 11,756,569 B2* | 9/2023 | Wang ...................... G10L 25/51 |
| | | 381/56 |
| 2012/0315605 A1* | 12/2012 | Cho ...................... G09B 21/008 |
| | | 434/114 |
| 2020/0005763 A1* | 1/2020 | Chae ...................... G10L 13/047 |

(Continued)

FOREIGN PATENT DOCUMENTS

CN 113453048 A * 9/2021 ............. G06F 3/016

*Primary Examiner* — Olga V Merkoulova
(74) *Attorney, Agent, or Firm* — Wiersch Law Group

(57) ABSTRACT

Provided are a method and a system for generating a haptic feedback effect, and a related device. The method includes: acquiring a training dataset comprising a video information and an audio information; performing a data cutting on the training dataset to obtain cut data; mapping the cut data into a haptic feedback information using a preset artificial intelligence according to a network coefficient; and outputting a haptic feedback effect according to the haptic feedback information. Compared with related art, the method for generating the haptic feedback effect of the present application incorporates the generation of haptic feedback information based on the artificial intelligence, so that manual operations are reduced during the generation process of haptic feedback effect, and the network coefficients are optimized to obtain the desired haptic feedback effect based on the pre-existing artificial results as the training set, thereby improving the vibration feedback experience in practical applications.

6 Claims, 4 Drawing Sheets

(56) References Cited

U.S. PATENT DOCUMENTS

| | | | |
|---|---|---|---|
| 2020/0249878 A1* | 8/2020 | Bismuth | G06F 3/0626 |
| 2021/0020160 A1* | 1/2021 | Chen | G06N 3/08 |
| 2021/0090410 A1* | 3/2021 | Albright | G06F 18/2155 |
| 2021/0306782 A1* | 9/2021 | Klinke | H04R 29/005 |
| 2023/0135737 A1* | 5/2023 | Lu | G06F 21/64 706/12 |

\* cited by examiner

METHOD AND SYSTEM FOR GENERATING HAPTIC FEEDBACK EFFECT, AND RELATED DEVICE

TECHNICAL FIELD

The present application relates to the technical field of artificial intelligence, in particular to a method and a system for generating a haptic feedback effect and a related device.

BACKGROUND

With the improvement of science and technology, Artificial Intelligence (AI) has gradually comed into people's lives. Nowadays, on the basis of language, image, and text, the artificial intelligence establishes a huge database to perform depth and autonomous learning and calculates the result through this mode. The artificial intelligence identifies the environment information through the sensor and filters it with known information from the input, which feeds into the practical applications.

In the related art, a haptic feedback system with a vibration motor as a carrier is widely adopted in application scenarios such as mobile phones, smart watchs, tablet computers, and vehicles. How to drive the vibration motor to obtain the desired experience effect becomes a key action for generating a haptic feedback effect. The haptic feedback describes the desired effect by means of "strength+frequency". In a conventional practice, a designer produces "magnitude+phase" information of different time periods by means of manual operation based on a segment of audio or video, and controls a motor by means of the two abstracted parameters, so as to achieve the desired vibration effect. However, this approach has a higher requirement for audio designers, and needs to manually convert audio and video into an effect file, which is time-consuming, and the results may vary greatly from one person to another.

Therefore, it is necessary to provide a new method for generating a haptic feedback effect, so as to save manpower costs for designers and generate different effects for haptic feedback on the basis of different sounds and videos in the practical living environment.

SUMMARY

The technical problem to be solved by the present application is to provide a method for generating different haptic feedback effects on the basis of practical living environment while saving human costs.

In order to solve the above-mentioned technical problem, in the first aspect, the present application provides a method for generating a haptic feedback effect, comprising:
acquiring a training dataset comprising a video information and an audio information;
performing a data cutting on the training dataset to obtain cut data;
mapping the cut data into a haptic feedback information using a preset artificial intelligence according to a network coefficient; and
outputting a haptic feedback effect according to the haptic feedback information.

In an embodiment, a method of performing the data cutting on the training dataset to obtain the cut data is: framing the training dataset according to a preset frame length and a duration of the training dataset.

In an embodiment, the haptic feedback information comprises a vibration intensity information and a vibration frequency information.

In an embodiment, before the step of mapping the cut data into the haptic feedback information using the preset artificial intelligence, the method further comprises:
manually labeling the cut data with the haptic feedback information to obtain pre-training data; and
training the preset artificial intelligence according to the pre-training data; saving parameters of the preset artificial intelligence that has completed training, and outputting the network coefficient for the preset artificial intelligence to generate the haptic feedback information.

In an embodiment, after the step of outputting the haptic feedback effect according to the haptic feedback information, the method further comprises:
determining whether the haptic feedback effect satisfies a preset haptic feedback requirement;
if yes, mapping a next segment of the cut data using the preset artificial intelligence according to the current network coefficient;
If no, synchronously updating the network coefficient using a manual calibration method.

In the second aspect, the present application further provides a system for generating a haptic feedback effect, comprising:
a data acquiring module configured to acquire a training dataset comprising a video information and an audio information;
a data cutting module configured to perform a data cutting on the training dataset to obtain cut data;
a data mapping module configured to map the cut data into a haptic feedback information using a preset artificial intelligence according to a network coefficient; and
a haptic feedback output module configured to output a haptic feedback effect according to the haptic feedback information.

In the third aspect, the present application further provides a computer device, comprising a memory, a processor, and a computer program stored on the memory and executable on the processor; wherein when the processor executes the computer program, steps in any one of the above-mentioned method for generating the haptic feedback effect.

Compared with the related art, in the method for generating the haptic feedback effect of the present application, the haptic feedback information is generated based on the artificial intelligence, and the audio data including a certain number of videos or audios are cut. Then the haptic feedback information is calibrated, so as to complete the training process. Therefore, the process for generating the haptic feedback effect can reduce manual operations. Besides, on the basis of a previous manual result serving as a training set, when the sample data and the number of iterations are sufficient, a desired haptic feedback effect can be obtained by an optimized network coefficient, thereby improving the vibration feedback experience in practical applications.

BRIEF DESCRIPTION OF THE DRAWINGS

In order to describe the technical solutions in the embodiments of the present application more clearly, the accompanying drawings required for describing the embodiments of the present application will be briefly introduced as follows. Apparently, the accompanying drawings in the following description are merely some embodiments of the present application, rather than all embodiments. For those skilled in the art, other drawings may also be obtained according to these accompanying drawings without creative efforts.

DETAILED DESCRIPTION OF THE EMBODIMENTS

The technical solutions in the embodiments of the present application will be clearly and completely described as follows with reference to the accompanying drawings in the embodiments of the present application. Apparently, the embodiments to be described are only a part rather than all of the embodiments of the present application. All other embodiments obtained by those skilled in the art based on the embodiments of the present application without creative efforts shall belong to the protection scope of the present application.

Figure 1:
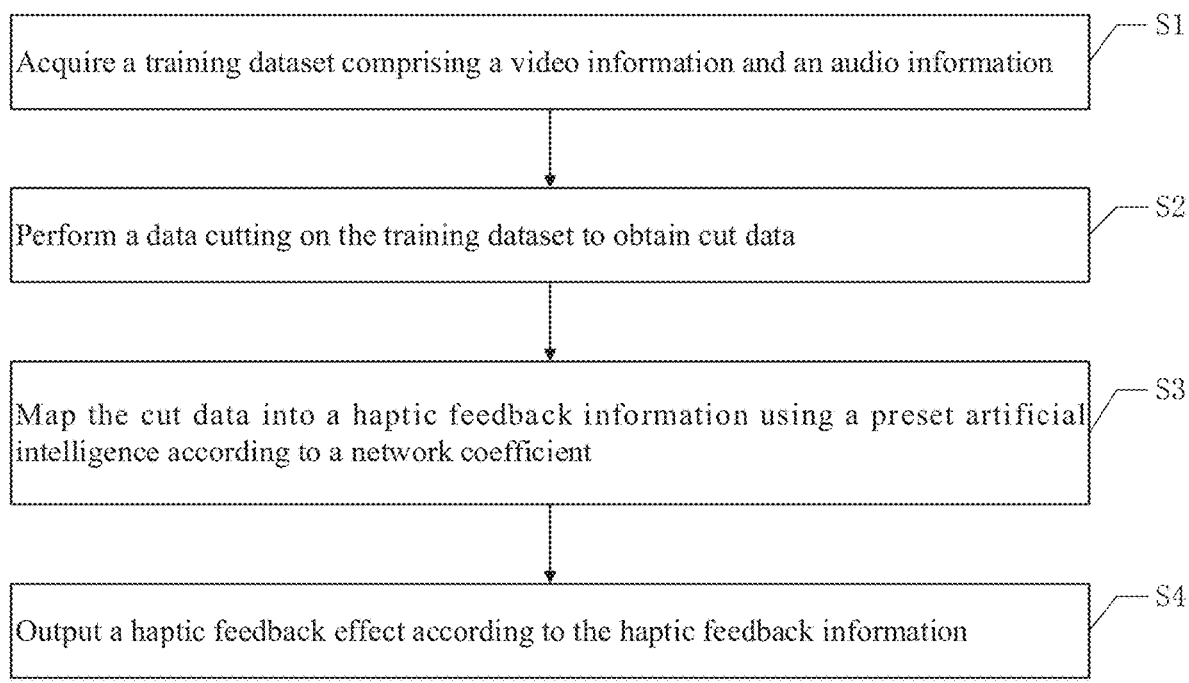
FIG. 1 is a flowchart of a method for generating a haptic feedback effect according to an embodiment of the present application.

Referring to FIG. 1, FIG. 1 is a flowchart of a method for generating a haptic feedback effect according to an embodiment of the present application, and the method includes the following steps.

S1: a training dataset including video information or audio information is acquired.

Specifically, the data containing information may be video data or audio data, and the audio information is continuous with an increase over time in the training dataset and has an acoustic feature, such as frequency. In the embodiment of the present application, a manner for acquiring the training dataset may be obtained by cutting from existing audio data, and may also be obtained by collecting in real time such as recording and shooting.

S2: a data cutting is performed on the training dataset to obtain cut data.

In an embodiment, a method of performing the data cutting on the training dataset is: performing a framing processing on the training dataset according to a preset frame length and a duration of the training dataset.

The preset frame length may be set according to practical requirements. For different types of audio data, different preset frame lengths may be correspondingly set according to a tempo, a recording manner of the audio data, and the like.

In an embodiment, the haptic feedback information includes vibration intensity information and vibration frequency information.

In an embodiment, before the step of mapping the cut data into the haptic feedback information, the method further includes the following steps.

The cut data is manually labeled with the haptic feedback information to obtain pre-training data.

The preset artificial intelligence is trained according to the pre-training data. Parameters of the preset artificial intelligence that have been trained are stored, and the network coefficients for the preset artificial intelligence are output to generate the haptic feedback information.

Figure 2:
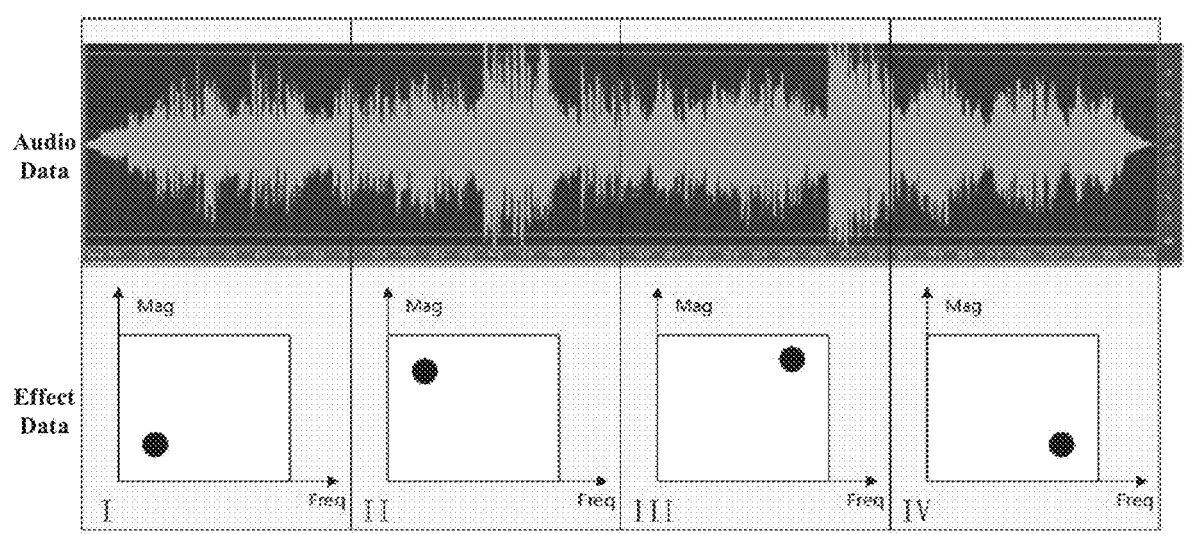
FIG. 2 is a diagram illustrating haptic feedback information according to an embodiment of the present application.

Specifically, referring to FIG. 2, FIG. 2 is a diagram illustrating the haptic feedback information according to an embodiment of the present application. The haptic feedback information is represented in a form of two dimensions in the embodiment of the present application. Taking the two-dimensional data of I in FIG. 2 as an example, a segment of audio data may be represented by a segment of frequency. In order to obtain the haptic feedback information to be presented by the segment of audio data, in spatial coordinates, an abscissa represents the vibration intensity information of the audio data and an ordinate represents the vibration frequency information of the audio data. Finally, the corresponding haptic feedback information is labeled as a low-intensity, low-frequency effect shown in I. For a second segment of audio data with higher frequency, the corresponding vibration frequency information may be adjusted to a higher frequency during labeling, so as to embody characteristics of different audios. The preliminary training for the preset artificial intelligence is acquired by means of manual calibration, and the directionality of the preset artificial intelligence for generating the haptic feedback information is controlled by means of manual intervention, thereby obtaining a feedback effect conforming to the user experience.

S3: the cut data is mapped into the haptic feedback information using the preset artificial intelligence according to the network coefficients.

The preset artificial intelligence may be implemented based on a neural network model, or may also be an automated program with parameter updating and iteration. The network coefficients are equivalent to model parameters in the neural network model, or control parameters in an automation program. When one training is completed, the flow of the preset artificial intelligence generating the haptic feedback information can be fixed by outputting the network coefficients, and the generation capability of the preset artificial intelligence is gradually improved in continuous iterations.

S4: a haptic feedback effect is output according to the haptic feedback information.

The haptic feedback effect is specifically generated according to the vibration intensity information and the vibration frequency information in the haptic feedback information. There is an one-to-one correspondence between the haptic feedback effect and the audio data when the haptic feedback information is generated at one time. In the embodiments of the present application, the haptic feedback effect needs to be implemented through a vibration feedback system mainly using a motor.

In an embodiment, after the step of outputting the haptic feedback effect according to the haptic feedback information, the method further includes the following steps.

Whether the haptic feedback effect satisfies a preset haptic feedback requirement is determined.

If yes, a next segment of the cut data is mapped using the preset artificial intelligence according to the current network coefficients.

If not, the network coefficients are synchronously updated using a manual calibration mode.

Specifically, the preset haptic feedback requirement is a feedback mechanism, which is used to indicate whether the haptic feedback effect has a good correspondence with the corresponding audio data. When the haptic feedback effect does not satisfy the preset haptic feedback requirement, the haptic feedback information may be manually calibrated, and the existing network coefficient is updated, so that the finally mapped haptic feedback information can be closer to the effect corresponding to the audio data.

Compared with the related art, in the method for generating the haptic feedback effect of the present application, the haptic feedback information is generated based on the artificial intelligence, and the audio data including a certain number of videos or audios are cut. Then the haptic feedback information is calibrated, so as to complete the training process. Therefore, the process for generating the haptic feedback effect can reduce manual operations. Besides, on the basis of a previous manual result serving as a training set, when the sample data and the number of iterations are sufficient, a desired haptic feedback effect can be obtained by an optimized network coefficient, thereby improving the vibration feedback experience in practical applications.

Figure 3:
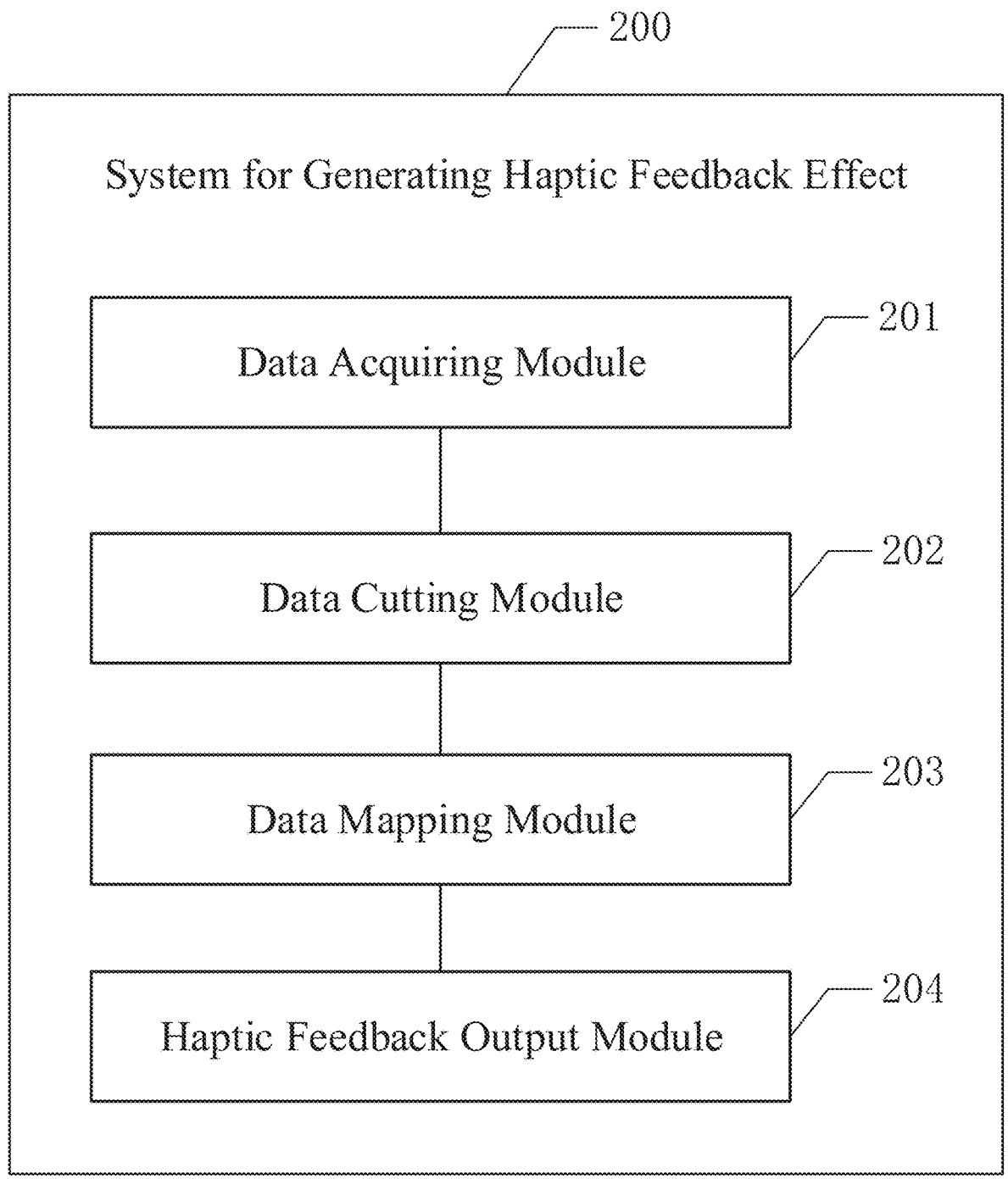
FIG. 3 is a structural diagram of a system 200 for generating a haptic feedback effect according to an embodiment of the present application.

The embodiments of the present application further provide a system for generating a haptic feedback effect. Referring to FIG. 3, FIG. 3 is a structural diagram of a system 200 for generating the haptic feedback effect according to an embodiment of the present application, and the system includes:
- a data acquiring module 201 configured to acquire a training dataset including video and audio information;
- a data cutting module 202 configured to perform a data cutting on the training dataset to obtain cut data;
- a data mapping module 203 configured to map the cut data into haptic feedback information using a preset artificial intelligence according to network coefficients; and
- a haptic feedback outputting module 204 configured to output a haptic feedback effect according to the haptic feedback information.

The system 200 for generating the haptic feedback effect provided in the embodiment of the present application can implement the steps in the method for generating the haptic feedback effect in the above-mentioned embodiment, and can achieve the same technical effect. The system may refer to the description in the above-mentioned embodiments, which are not repeatedly described herein.

Figure 4:
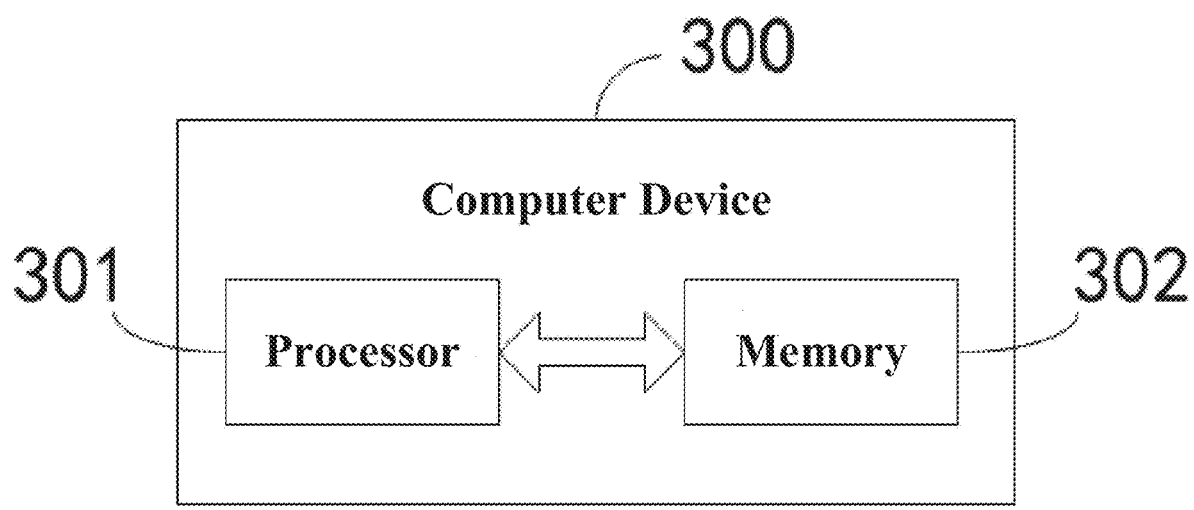
FIG. 4 is a structural diagram of a computer device according to an embodiment of the present application.

The embodiments of the present application further provide a computer device. Referring to FIG. 4, FIG. 4 is a structural diagram of a computer device according to an embodiment of the present application. The computer device 300 includes a processor 301, a memory 302, and a computer program that is stored on the memory 302 and executed on the processor 301.

Referring to FIG. 1, the processor 301 calls a computer program stored in the memory 302, and when the computer program is executed, steps in the method for generating the haptic feedback effect in the above-mentioned embodiments are implemented, including:
- acquiring a training dataset including video information and audio information;
- performing a data cutting on the training dataset to obtain cut data;
- mapping the cut data into haptic feedback information using a preset artificial intelligence according to network coefficients; and
- outputting a haptic feedback effect according to the haptic feedback information.

In an embodiment, a method of performing the data cutting on the training dataset to obtain the cut data is: framing the training dataset according to a preset frame length and a duration of the training dataset.

In an embodiment, the haptic feedback information includes vibration intensity information and vibration frequency information.

In an embodiment, before the step of mapping the cut data into the haptic feedback information using the preset artificial intelligence, the method further includes:
- manually labeling the cut data with the haptic feedback information to obtain pre-training data; and
- training the preset artificial intelligence according to the pre-training data; saving parameters of the preset artificial intelligence that has been trained, and outputting the network coefficients for the preset artificial intelligence to generate the haptic feedback information.

In an embodiment, after the step of outputting the haptic feedback effect according to the haptic feedback information, the method further includes:
- determining whether the haptic feedback effect satisfies a preset haptic feedback requirement;
- if yes, mapping a next segment of the cut data using the preset artificial intelligence according to the current network coefficients;
- If no, synchronously updating the network coefficients using a manual calibration method.

The computer device 300 provided in the embodiment of the present application can implement the steps in the method for generating a haptic feedback effect in the above-mentioned embodiment, and can achieve the same technical effect. This embodiment may refer to the description in the above-mentioned embodiments, which are not repeatedly described herein.

The embodiments of the present application further provide a computer-readable storage medium, and the computer-readable storage medium is stored with a computer program. When the computer program is executed by a processor, various processes and steps in the method of generating the haptic feedback effect provided by embodiments of the present application are implemented, and the same technical effect can be achieved, which are not repeatedly described herein to avoid repetition.

Described above are only the embodiments of the present application. It should be noted that, for those skilled in the art, improvements made without departing from the premise of the creation idea of the present application shall belong to the protection scope of the present application.

What is claimed is:

1. A method for generating a haptic feedback effect, comprising:
   acquiring a training dataset comprising a video information and an audio information;
   performing a data cutting on the training dataset to obtain cut data;
   mapping the cut data into a haptic feedback information using a preset artificial intelligence according to a network coefficient; and
   outputting a haptic feedback effect according to the haptic feedback information, wherein
   the haptic feedback information comprises a vibration intensity information and a vibration frequency information, the haptic feedback information is represented in a form of two dimensions, in spatial coordinates, an abscissa represents the vibration intensity information of the audio data and an ordinate represents the vibration frequency information of the audio data.

2. The method for generating the haptic feedback effect of claim 1, wherein a method of performing the data cutting on the training dataset to obtain the cut data is: performing a framing processing on the training dataset according to a preset frame length and a duration of the training dataset.

3. The method for generating the haptic feedback effect of claim 1, wherein before the step of mapping the cut data into the haptic feedback information using the preset artificial intelligence, the method further comprises:
    manually labeling the cut data with the haptic feedback information to obtain pre-training data; and
    training the preset artificial intelligence according to the pre-training data; storing parameters of the preset artificial intelligence that have been trained, and outputting the network coefficient for the preset artificial intelligence to generate the haptic feedback information.

4. The method for generating the haptic feedback effect of claim 3, wherein after the step of outputting the haptic feedback effect according to the haptic feedback information, the method further comprises:
    determining whether the haptic feedback effect satisfies a preset haptic feedback requirement;
    if yes, mapping a next segment of the cut data using the preset artificial intelligence according to the current network coefficient;
    If no, synchronously updating the network coefficient using a manual calibration method.

5. A system for generating a haptic feedback effect, comprising:
    a data acquiring module configured to acquire a training dataset comprising a video information and an audio information;
    a data cutting module configured to perform a data cutting on the training dataset to obtain cut data;
    a data mapping module configured to map the cut data into a haptic feedback information using a preset artificial intelligence according to a network coefficient; and
    a haptic feedback output module configured to output a haptic feedback effect according to the haptic feedback information,
    wherein the system for generating the haptic feedback effect could implement the steps in the method for generating the haptic feedback effect in the above-mentioned embodiment.

6. A computer device, comprising:
    a memory;
    a processor; and
    a computer program stored on the memory and executable on the processor;
    wherein when the processor executes the computer program, steps in the method for generating the haptic feedback effect according to of claim 1 are implemented.

* * * * *